(12) United States Patent
Carmel et al.

(10) Patent No.: US 10,423,509 B2
(45) Date of Patent: Sep. 24, 2019

(54) SYSTEM AND METHOD FOR MANAGING ENVIRONMENT CONFIGURATION USING SNAPSHOTS

(75) Inventors: Yuval Carmel, Yehud (IL); Guy Peleg, Yehud (IL); Michal Halamish, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 773 days.

(21) Appl. No.: 13/198,893

(22) Filed: Aug. 5, 2011

(65) Prior Publication Data
US 2013/0036214 A1    Feb. 7, 2013

(51) Int. Cl.
*G06F 15/173*    (2006.01)
*G06F 11/30*     (2006.01)

(52) U.S. Cl.
CPC ...... *G06F 11/3006* (2013.01); *G06F 11/3051* (2013.01)

(58) Field of Classification Search
CPC .................... G06F 11/3051; G06F 11/3006
USPC ........................................ 709/220, 221, 223
See application file for complete search history.

(56) References Cited

U.S. PATENT DOCUMENTS

| | | | |
|---|---|---|---|
| 6,282,175 B1 * | 8/2001 | Steele et al. | 370/254 |
| 6,385,767 B1 * | 5/2002 | Ziebell | 717/170 |
| 6,779,134 B1 * | 8/2004 | Laviolette | G06F 11/3006 714/38.12 |
| 6,885,641 B1 * | 4/2005 | Chan et al. | 370/252 |
| 7,003,560 B1 * | 2/2006 | Mullen et al. | 709/223 |
| 7,065,566 B2 * | 6/2006 | Menard et al. | 709/223 |
| 7,278,106 B1 * | 10/2007 | Mason | 715/744 |
| 7,340,640 B1 * | 3/2008 | Karr et al. | 714/6.23 |
| 7,444,350 B1 * | 10/2008 | MacKinnon et al. | |
| 7,568,080 B2 | 7/2009 | Prahlad et al. | |
| 7,603,452 B1 * | 10/2009 | Guo | 709/223 |
| 8,180,846 B1 * | 5/2012 | Zur et al. | 709/217 |
| 8,356,088 B2 * | 1/2013 | Montagna et al. | 709/220 |
| 8,447,737 B2 * | 5/2013 | McKay | 707/682 |
| 8,793,371 B1 * | 7/2014 | Nanekar et al. | 709/224 |
| 2003/0005109 A1 * | 1/2003 | Kambhammettu | G06F 11/302 709/224 |
| 2003/0233385 A1 * | 12/2003 | Srinivasa | G06F 9/466 718/1 |
| 2004/0059813 A1 * | 3/2004 | Bolder et al. | 709/224 |

(Continued)

FOREIGN PATENT DOCUMENTS

| | | | | |
|---|---|---|---|---|
| EP | 2287752 A1 | * | 2/2011 | |
| WO | WO-2006089352 A1 | * | 8/2006 | G06F 21/57 |
| WO | WO 2011126635 A1 | * | 10/2011 | |

OTHER PUBLICATIONS https://searchdatacenter.techtarget.com/definition/configuration-management-database; 2018.*

(Continued)

*Primary Examiner* — Kostas J Katsikis (57) ABSTRACT

The method may include periodically obtaining snapshots of the configuration of an environment. The method may also include logging the snapshots of the configuration of the environment in composite CI level. The method may further include causing display of configuration information relating to a first snapshot of the snapshots in composite CI level, while indicating configuration changes in that snapshot with respect to a second earlier snapshot of said snapshots.

18 Claims, 6 Drawing Sheets

(56) References Cited

U.S. PATENT DOCUMENTS

| | | | | |
|---|---|---|---|---|
| 2005/0038827 | A1* | 2/2005 | Hooks | G06F 11/0748 |
| 2005/0182797 | A1 | 8/2005 | Adkins et al. | |
| 2005/0187992 | A1* | 8/2005 | Prahlad | G06F 11/1435 |
| 2006/0167859 | A1 | 7/2006 | Shim | |
| 2007/0100712 | A1* | 5/2007 | Kilpatrick et al. | 705/29 |
| 2007/0100892 | A1* | 5/2007 | Kephart et al. | 707/200 |
| 2008/0183775 | A1 | 7/2008 | Prahlad et al. | |
| 2009/0006619 | A1* | 1/2009 | Mohammed | G06F 11/1458 709/225 |
| 2009/0177878 | A1* | 7/2009 | Gao | H04L 67/1097 713/100 |
| 2009/0216867 | A1* | 8/2009 | Pusateri et al. | 709/222 |
| 2009/0307449 | A1* | 12/2009 | Prahlad et al. | 711/162 |
| 2010/0115100 | A1* | 5/2010 | Tubman | G06F 17/30545 709/227 |
| 2010/0191952 | A1* | 7/2010 | Keinan | 713/100 |
| 2010/0223253 | A1* | 9/2010 | Gopal | G06F 16/217 707/713 |
| 2011/0016342 | A1* | 1/2011 | Rowan | G06F 11/3006 713/340 |
| 2011/0035697 | A1* | 2/2011 | Rempel et al. | 715/781 |
| 2011/0054964 | A1* | 3/2011 | Anand | G06F 11/3006 714/57 |
| 2011/0126047 | A1* | 5/2011 | Anderson | H04L 9/3213 714/15 |
| 2011/0219385 | A1* | 9/2011 | Jacobson | G06F 8/61 719/328 |
| 2012/0072556 | A1* | 3/2012 | Wang et al. | 709/220 |
| 2012/0110142 | A1* | 5/2012 | Montagna et al. | 709/220 |
| 2012/0290827 | A1* | 11/2012 | Bhargava et al. | 713/100 |
| 2013/0007538 | A1* | 1/2013 | Gupta | G06F 11/0709 714/57 |
| 2013/0247032 | A1* | 9/2013 | Bhargava | G06F 11/3006 718/1 |

OTHER PUBLICATIONS https://web.archive.org/web/20100928014326/https://searchdatacenter.techtarget.com/definition/configuration-management-database; 2010.*

"DbForge Data Compare Express Oracle 2.0.10 (Windows)"; downloaded Aug. 10, 2011 at URL: http://www.techrepublic.com/software/dbforge-data-compare-express-for-oracle-2010-windows/2455627.

Chuang-Hue Moh; "A Snapshot Utility for a Distributed Object-Oriented Database System", pp. 1-19; Aug. 14, 2002; MIT Laboratory for Computer Science, Cambridge, MA 02139.

* cited by examiner

SYSTEM AND METHOD FOR MANAGING ENVIRONMENT CONFIGURATION USING SNAPSHOTS

BACKGROUND

Information Technology (IT) configuration managers are often interested in tracking configuration changes in a monitored environment as part of incident/problem management or auditing activities. Such changes may be authorized changes that have been approved (this may be verified by correlating these changes to existing Requests For Change—RFCs, and checking the compliance of the corresponding composite configuration items of the environment) or unauthorized changes.

When monitoring the configuration of an environment of composite configuration items (CIs) of a large organization, numerous CIs are to be considered. Typically, IT managers refer to "snapshots" of the environment, which are historical states of configuration of that environment that are recorded in the course of time.

Snapshot comparison in real time may be very time consuming, especially when considering large environments.

BRIEF DESCRIPTION OF THE DRAWINGS

Embodiments of the present invention are described in the following detailed description and illustrated in the accompanying drawings in which.

DETAILED DESCRIPTION

Figure 1:
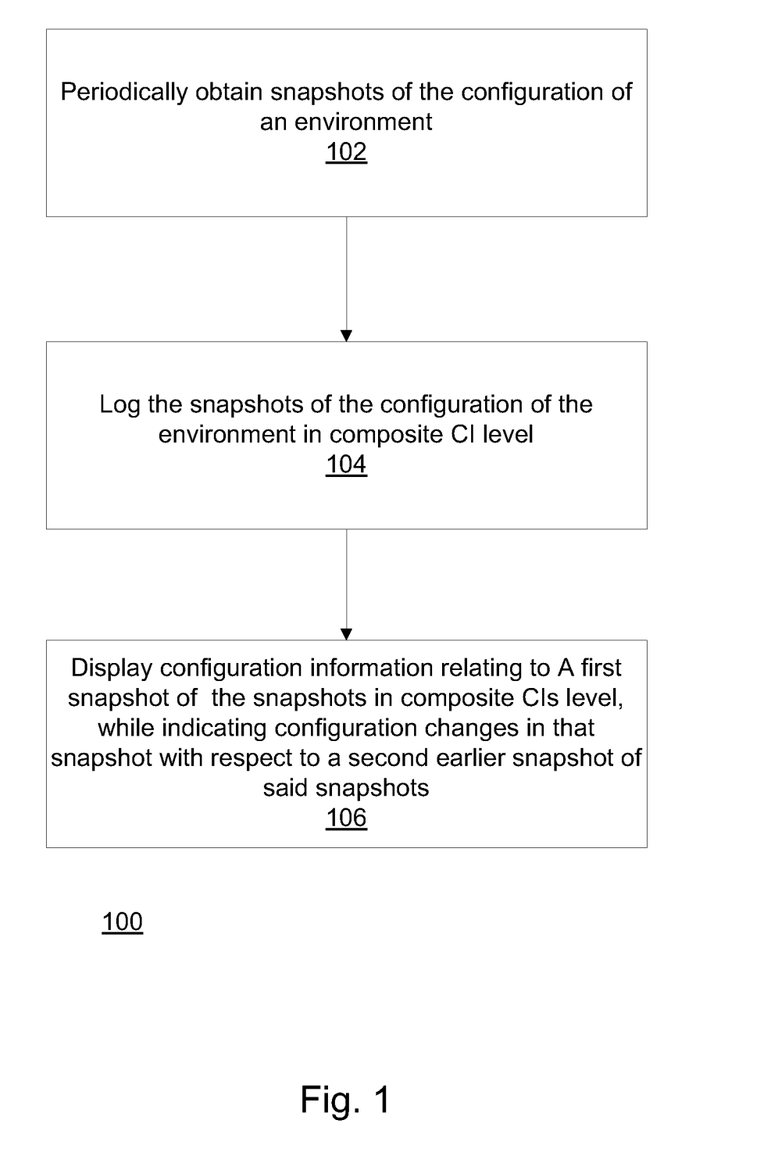
FIG. 1 illustrates a method 100 for monitoring configuration changes of an environment of composite configuration items (CIs), in accordance with embodiments of the present invention.

FIG. 1 illustrates a method 100 for monitoring configuration changes of an environment of composite configuration items (CIs), in accordance with embodiments of the present invention. Method 100 may include periodically obtaining 102 snapshots of the configuration of the composite CIs. Method 100 may further include logging 104 the snapshots of the configuration of the environment in composite configuration item (CI) level (aggregated information—e.g. only CI identification data and not the CIs themselves). Method 100 may also include displaying 106 configuration information relating to a first snapshot of the snapshots in composite CI level, while indicating configuration changes in that snapshot with respect to a second earlier snapshot of these snapshots. Displaying may include communication of the information to another device for display.

The configuration information may be stored in a dedicated database (such as, for example, Universal Configuration Management Data Base—UCMDB by HP). The displayed configuration information may be, for example, in the form of a high detail level snapshot representation of the monitored environment, but other levels of detail may be considered for display. In some embodiments the configuration information may include only CI identity, name and type. In other embodiments the configuration information may refer only to a portion of the CIs of the monitored environment (e.g. not all CIs, and in some cases even not most of the CIs) which may be sufficient to address most of the required or anticipated queries about the configuration of the environment.

An environment typically includes a plurality Composite CIs. A composite configuration item (CI) is a CI that includes other CIs. A composite CI may typically be made up of a root CI and other supporting CIs which are called contained CIs. A composite CI is typically said to exist as long as its root element can be uniquely identified. Supporting elements may be added to the composite CI after it has been created. Each definition of composite CI may include the attributes that the root and contained CIs in the composite can have.

For example, a server may be regarded as a composite CI, and it may include a root computer system object which may be related to various other items, such as hardware components, an operating system, software, and networking elements. A server may be created with a computer system only. The operating system, hardware, and networking elements can be added and updated at any time.

A Composite CI tree may include a "leading CI" as the root CI (e.g. UNIX server CI) and "component CIs" as nodes of that tree (e.g. CPU CI, File System CI etc.).

When obtaining snapshots of a configuration state of composite CIs of a monitored environment using the Composite CI level, such configuration snapshots may be of relatively small in size compared with other snapshot formats offering tracking and gathering information on configuration changes in an environment while minimizing loads on resources.

Figure 2:
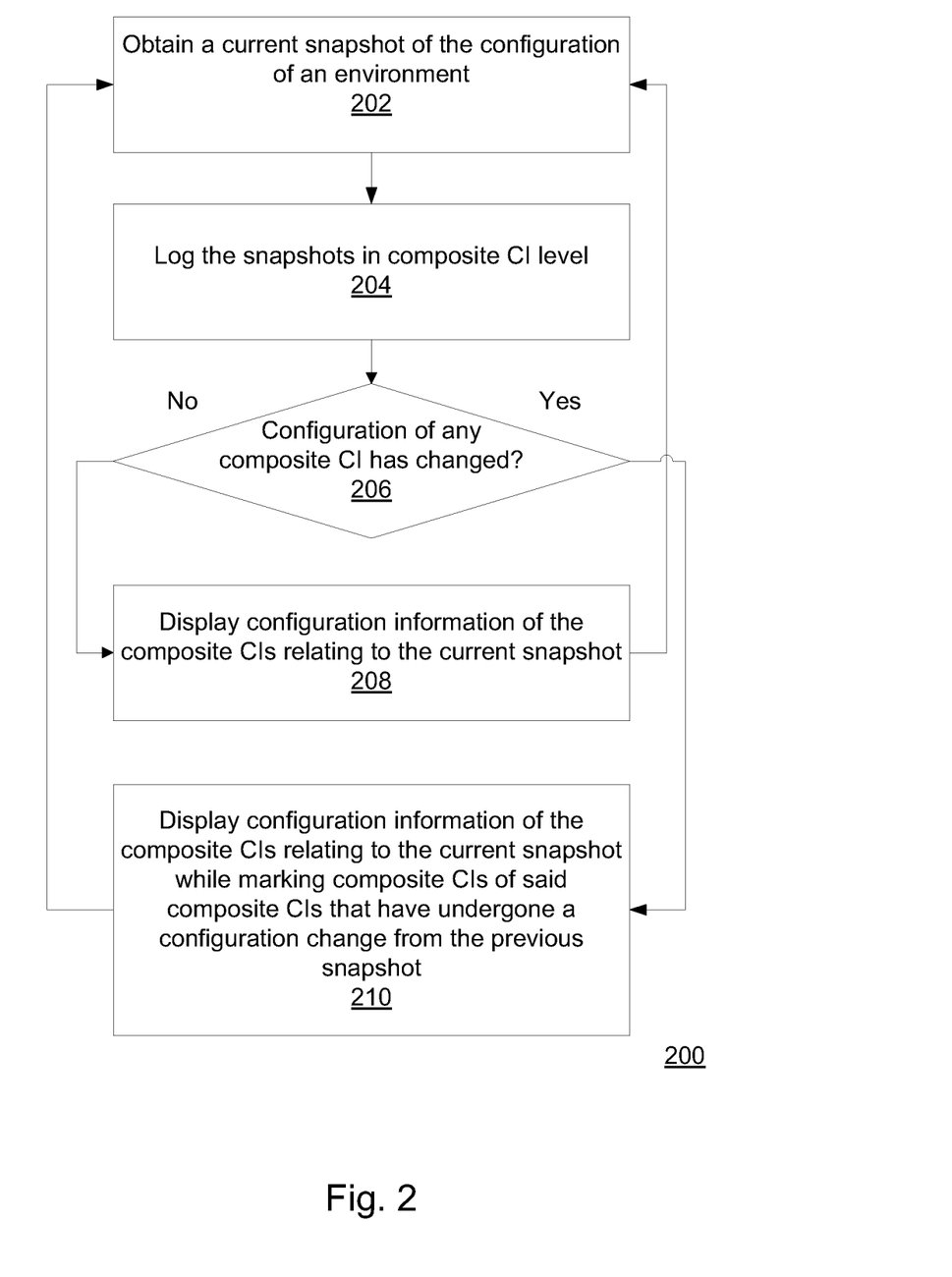
FIG. 2 illustrates a process for monitoring configuration changes of an environment of composite configuration items (CIs), in accordance with embodiments of the present invention.

FIG. 2 illustrates a process 200 for monitoring configuration changes of an environment of composite configuration items (CIs), in accordance with embodiments of the present invention. Process 200 may include obtaining 202 a current snapshot of the configuration of an environment. Process 200 may also include logging 204 the snapshot in composite CI level. It is then determined 206 whether the configuration of any composite CI in the current snapshot has changed with respect to a previous snapshot. If there is no change process 200 goes to display 208 configuration information of the current snapshot. If a change is determined, process 200 goes to display 210 configuration information of the current snapshot while marking composite CIs that have undergone a configuration change from the previous snapshot.

Figure 3:
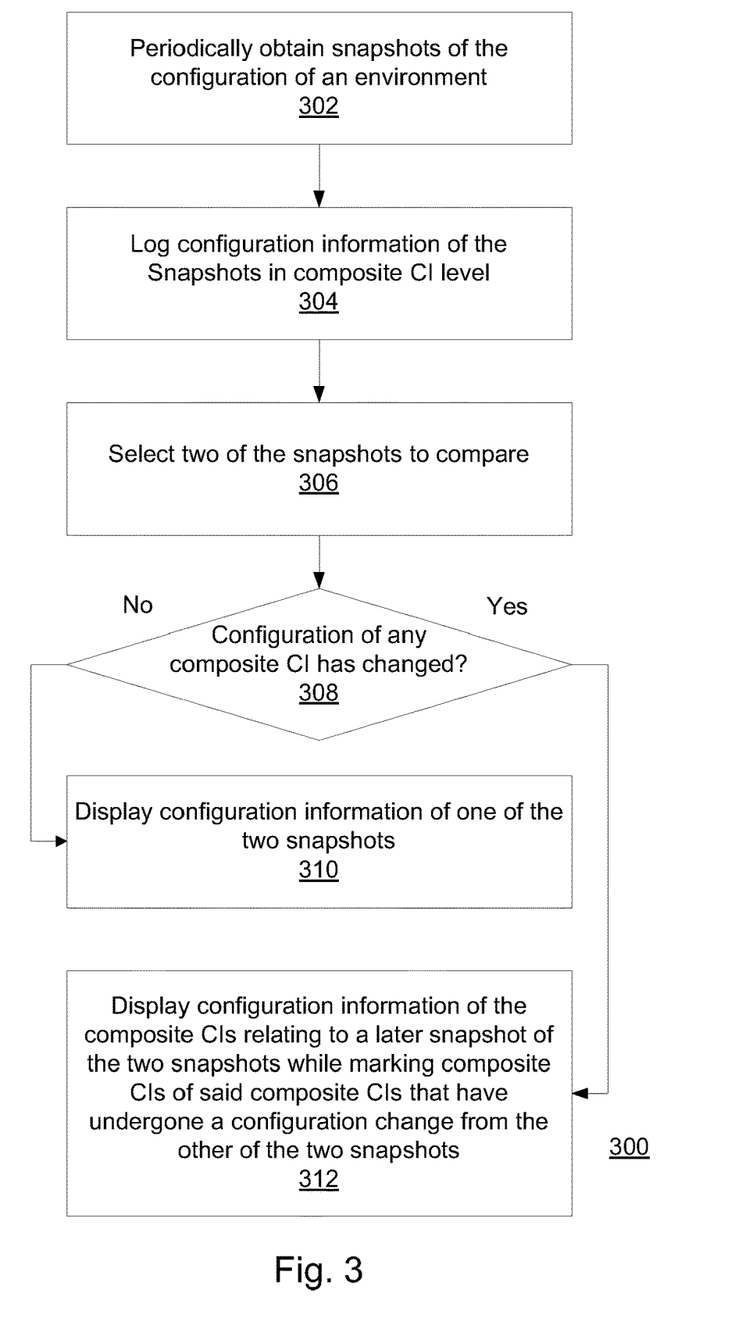
FIG. 3 illustrates a system for monitoring configuration changes of an environment of composite configuration items (CIs), in accordance with embodiments of the present invention.

FIG. 3 illustrates a process 300 for monitoring configuration changes of an environment of composite configuration items (CIs), in accordance with embodiments of the present invention. Process 300 may include obtaining 302 a current snapshot of the configuration of an environment. Process 300 may also include logging 304 the snapshot in composite CI level. Two of the logged snapshots may be selected 306 for comparison. It may then be determined 308 whether the configuration of any composite CI has changed between the two selected snapshots. If no configuration change has been determined then configuration information relating to one of the snapshots is displayed 310. If a configuration change has been determined, then configuration information of the composite CIs relating to a later snapshot of the two snapshots is displayed 312 while marking composite CIs of said composite CIs that have undergone a configuration change from the other of the two snapshots.

A method or system for monitoring configuration changes of an environment of composite CIs may monitor changes in data logged in the UCMDB (which are affected by actual changes in configuration of composite CIs in the environment). In some embodiments, when configuration change occurs (e.g. a CI or a link changes), the system may automatically obtain a current snapshot of configuration information to the database. The snapshot information may be persisted in the Composite CI level (aggregated information), thus keeping much less CI and related information (since a Composite CI is a representation of an internal tree of CIs). When there is change in one of the CIs, a new version of the composite CI that holds the modified CI information is added to the database with a new version identification (and an indicator of the nature of the change—e.g. addition, deletion, update).

The snapshot information may be saved in the database aggregated on the composite CI level (containing aggregation about all the internal CI's). Enough snapshot information may be persisted to show the status of the Composite CI while allowing drilling down to details in the UCMDB system when needed.

In some embodiments the system may log only composite Cis that were changed in the environment. In some embodiment metadata may be used, and the configuration information may be separated into "static" and "dynamic" portions. Static information may be used to track information about CIs that do not change over time (ID, Name, Type, etc.). Dynamic information may refer to logged information on CIs whose configuration has changed over time, CI version—metadata that allows tracking changes in CIs and later on compare environments, CI Violations, Comparison status—compared with previous logged items, etc. The logged information may be arranged in the form of a table or tables. Each record in the dynamic table may have a start and end date that represent the validity of the log item in the history. In some embodiments only the dynamic portions of the configuration information may be changed and written (and rewritten), so that the logged information is kept to a minimum. Snapshots may be taken at determined intervals. The intervals may vary and may be configurable (allowing a user to change the rate at which snapshots are obtained). Snapshots may also be created synchronously in response to changes that are made by users (i.e. approving changes in environments). In other embodiments the snapshots may be taken manually upon user requests.

In some embodiments the environment topology may be compressed into aggregative topology, which is typically compact and thus suitable for persistence.

In some embodiments CI historical compliance results (status) may be persisted in conjunction with a leading CI (also referred to as—"the root CI") of the composite CIs. CI data may be thus fetched together with its compliance information for incorporation in a Snapshot.

Snapshots may contain very large set of CIs and links thus users may be allowed to navigate through the snapshots data, using filters and paginating over the results. According to embodiments of the present invention fetching any snapshot or comparing between any two topological snapshots, returning paginated results, sliced and diced using filters may all be facilitated. The user may see filter suggested values based on the data. Using this capability one may conveniently see the kind of data that is in the list and thus helping to the understanding and analyzing of the set of data that is under inspection.

In accordance to some embodiments other queries may be made, that may require extra information which is kept in the UCMDB. This may occur when a user wishes to focus on a specific CI(s). Since only a fraction of the configuration information is stored (in composite CI level), one may need in such cases to add the missing information from the UCMDB, but since the data is usually asked for just a few CIs, these queries may be completed very quickly. Thus, composite CI configuration information may be saved in a configuration management database, the detailed CI information may be saved in the UCMDB. CM data may be used to show the results in high level detail, for example, in high performance by normalizing the data as required or desired. When it is desired to drill into more details the full set of data in UCMDB may be accessed and retrieved. As this dataset is very small scalability may not be an issue.

Figure 4:
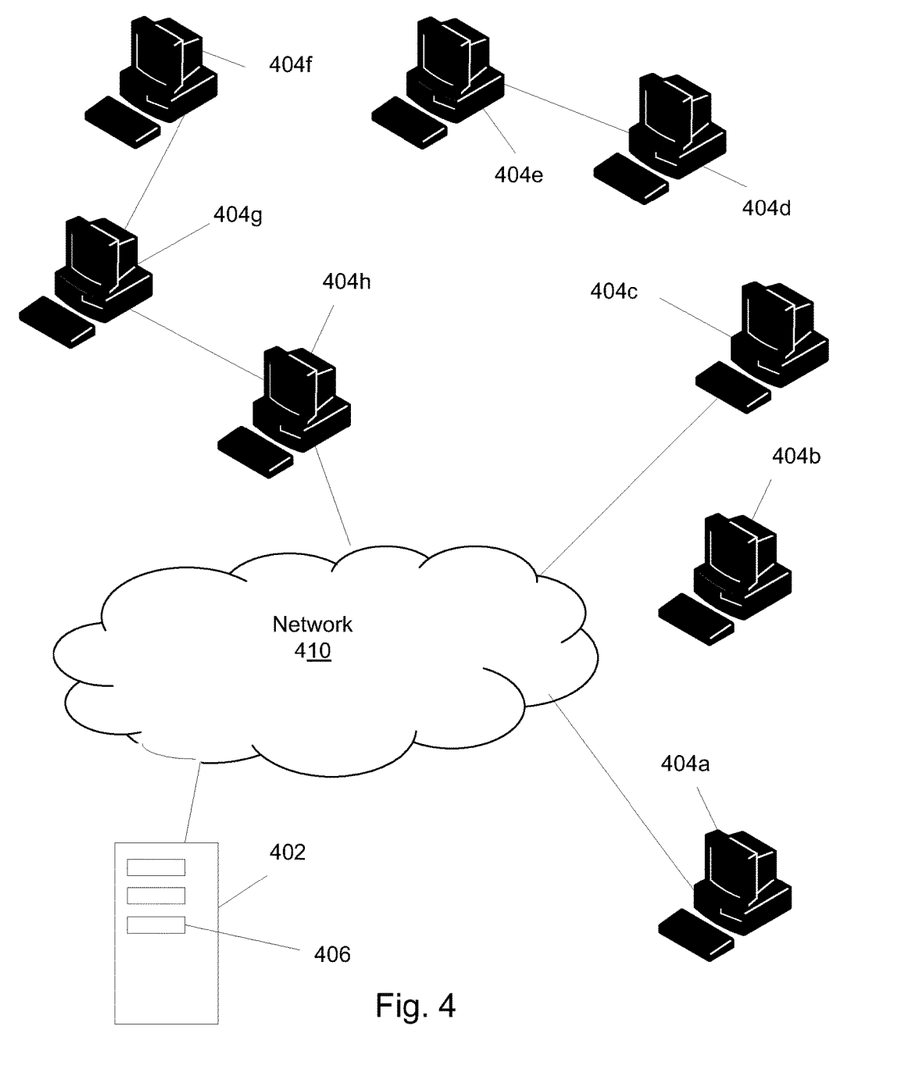
FIG. 4 illustrates a device for monitoring configuration changes of an environment of composite configuration items (CIs), in accordance with embodiments of the present invention.

FIG. 4 illustrates a system for monitoring configuration changes of an environment, in accordance with embodiments of the present invention.

An organization may have under its disposal various composite CIs (404*a-g*). For example, there may be CIs (404*a*, 404*c*) connected over a network 410 to configuration policy extractor device 402. there may also be, for example, composite CIs (404*d-e*, 404*f-g*) connected by a local network, either connected to (404*f-h*) or separated from (404*d-e*) network 410. Additional CIs may include stand-alone composite CI (404*c*).

Device for monitoring configuration changes of an environment 402 may be provided in the form of a server or a host, and may include module 406 for monitoring configuration changes of an environment, which is designed to execute a method for monitoring configuration changes of an environment, in accordance with embodiments of the present invention.

Figure 5:
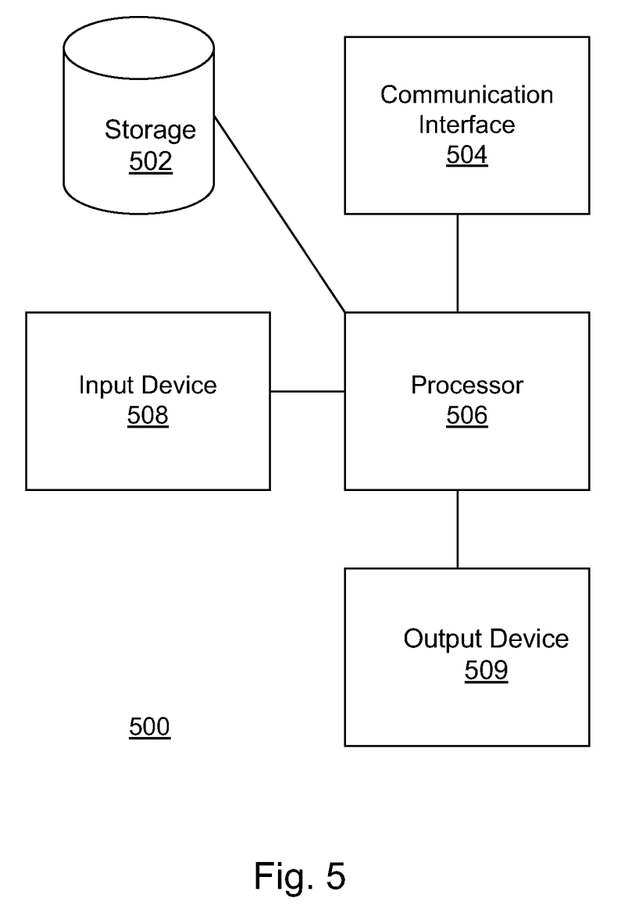
FIG. 5 illustrates a graphical user interface (GUI) of an application for monitoring configuration changes of an environment of composite configuration items (CIs), in accordance with embodiments of the present invention.

FIG. 5 illustrates a device 500 for monitoring configuration changes of an environment, in accordance with some embodiments of the present invention. Such a device may include a non-transitory storage device 502, such as, for example a hard-disk drive, for storing configuration data and executable programs for monitoring configuration changes of an environment, in accordance with embodiments of the present invention, that may be executed on processor 506. An input device 508, such as, for example, keyboard, pointing device, electronic pen, touch screen and the like, may be provided to facilitate input of information or commands by a user. Communication interface 504 may be provided to allow communications between the device for monitoring configuration changes of an environment and an external device. Such communications may be point-to-point communication, wireless communication, communication over a network, or other types of communications, facilitating input or output of information to or from the device. Output device 509 may also be provided, for outputting information from the device, e.g. a monitor, printer or other output device.

The storage device 502 may be used for storing configuration data such as, for example, a Configuration Management Data Base (CMDB). According to some embodiments of the present invention, system 500 may include a crawler application that constantly, periodically or otherwise, searches an organization network to collect snapshots of the configuration status of its composite CIs.

Figure 6:
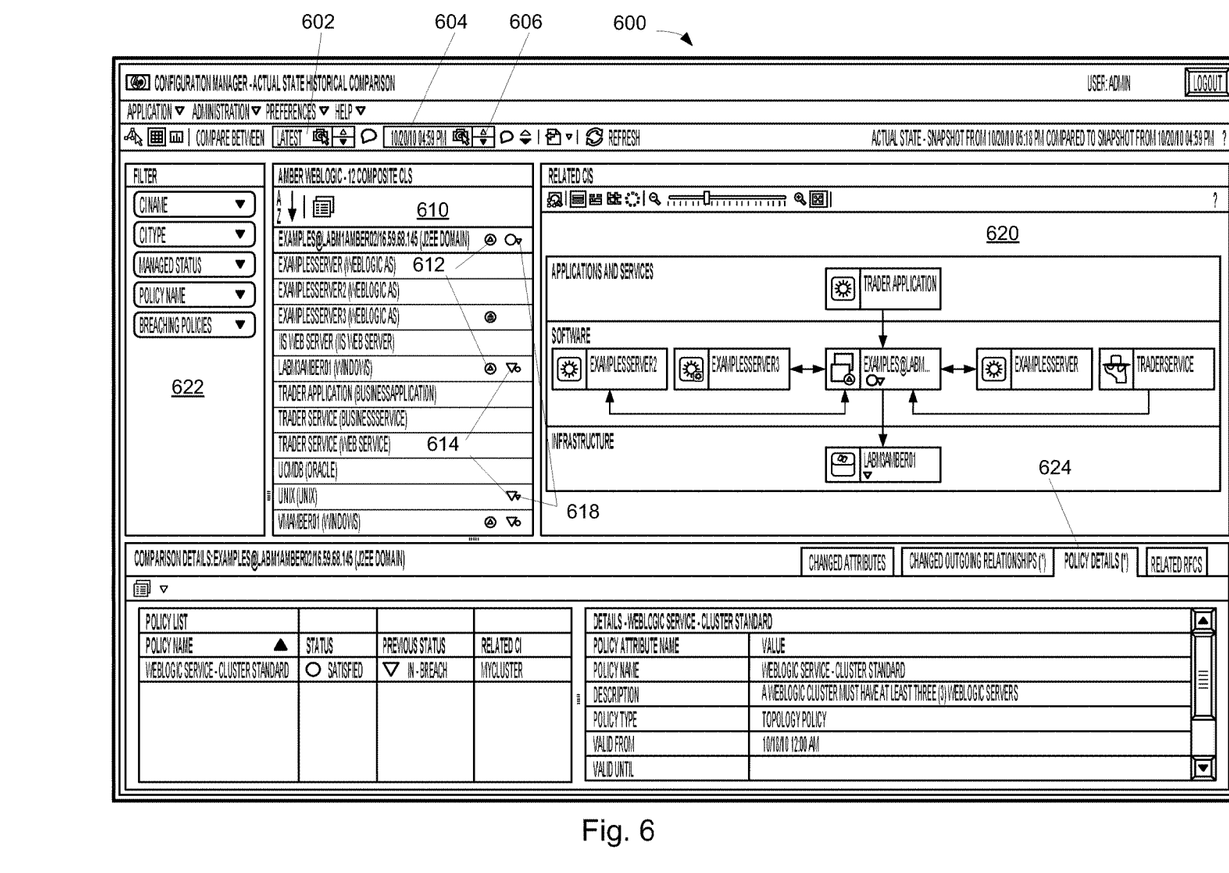
FIG. 6 illustrates a graphical user interface (GUI) of an application for monitoring configuration changes of an environment according to embodiments of the present invention.

FIG. 6 illustrates a graphical user interface (GUI) of an application for monitoring configuration changes of an environment according to embodiments of the present invention. Screen 600 for comparison of snapshots of an environment is shown. A user may select two snapshots to compare, e.g. by making a selection in a first snapshot field ("latest" snapshot 602) and in a second snapshot field (data field 604). In some embodiments the user may move forward or backward in the date field by clicking on arrows 606. A center list 610 may contain the CIs of the compared snapshots (including their outgoing links) in the environment while indicating whether the CIs or links are new, deleted or updated (using specific indicators 612, 614 and 616 respectively). Next to the change indicator, there may be a policy status indicator 618 that specifies the compliance level for this CI. The right-hand side list 620 may provide topology visualization of the environment related to the selected CI. On the left panel 622 the user may filter the CI list by selecting one or more filter criteria, such as, for example, CI name, CI type, CI that has changed between the 2 snapshots, CI related to specific policy rules, CI that adhere to specific compliance level. The bottom portions (e.g. tabs) 624 may provide detailed information about changes in CI attributes, changes in CI outgoing links, details about the CI compliance level and list of related request for change on the CI. The GUI may be used handle large environments, while ad-hoc selecting and changing snapshots to compare. The data may be paginated to the GUI using lightweight objects that may provide minimal data to present top level data; each tab 624 and dialog may provide further information from the CM database and from UCMDB.

On large environments filtering may become very helpful for understanding the type of data that is in the environment even without looking at the details. Additional filter criteria may include instance count filtering specific CI attributes.

One may correlate between detected configuration changes with automation flows that may be run on the environment, so as to provide heuristic information about how successful an automation flow is, and by that predict how risky it would be to run it.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon. Such non-transitory computer readable medium may include instructions that when executed cause a processor to execute method steps in accordance with embodiments of the present invention. In some embodiments of the present invention the instructions stores on the computer readable medium may be in the form of an installed application and in the form of an installation package.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A method for managing configuration of an environment of composite configuration items (CIs), the method comprising, with a processor:
obtaining a snapshot of the configuration of the environment comprising current configuration data about the CIs in the environment at a time of the snapshot;
logging the snapshot of the configuration of the environment in a configuration database, where the configuration database stores the snapshot;
identifying a set of changes to the environment using the configuration database;
storing the identified changes in a change database, wherein the change database is accessible from an external device through a graphical user interface (GUI), wherein the change database is provided to the external device in a format that includes selectable filters, wherein the filters of the change database are preset in the GUI based on content of the change database;
receiving a request for a plurality of snapshots from the external device for comparison using the GUI and providing configuration data associated with the plurality of snapshots to the external device through the GUI;
with the GUI, automatically displaying a list of CIs associated with the requested plurality of snapshots;
with the GUI, automatically displaying a first indicator in a first location of the GUI corresponding to a first CI of the list of CIs to represent whether a change occurred in the first CI among snapshots of the requested plurality of snapshots and to represent a type of change, wherein the first indicator visually represents the first CI being modified, the first CI being new, or the first CI being deleted; and
with the GUI, automatically displaying a second indicator in a second location of the GUI corresponding to a second CI of the list of CIs to represent a compliance level associated with the second CI.

2. The method of claim 1, wherein filtered data provided to the external device is paginated in lightweight objects that provide minimal data to present top level data.

3. The method of claim 1, wherein the change database comprises a status indicator that indicates compliance of the CIs with a configuration policy.

4. The method of claim 1, wherein, for each of the CIs, the change database stores composite configuration item (CI) identity, CI name, and CI type.

5. The method of claim 1, further comprising, displaying, with the GUI, a configuration of one of the CIs at two different time points in a side by side format.

6. The method of claim 5, further comprising, with the GUI, stepping to a different change to the displayed CI in response to a command.

7. The method of claim 1, further comprising correlating identified changes to the environment with automation flows run on the environment to provide heuristic information about success of an automation flow.

8. A data processing system for evaluating changes to a network environment, the system comprising:
an external device including a processor;
a graphical user interface (GUI) on the external device to, in response to a user request through the external device:
receive a request for a plurality of snapshots of the network environment from the external device for comparison;
provide configuration data associated with the plurality of snapshots to the external device;
display a list of composite configuration items (CIs) associated with the request of plurality of snapshots;
automatically display a first indicator in a first location of the GUI corresponding to a first CI of the list of CIs to represent whether a change occurred in the first CI among snapshots of the requested plurality of snapshots and to represent a type of change, wherein the first indicator visually represents the first CI being modified, the first CI being new, or the first CI being deleted; and
automatically display a second indicator in a second location of the GUI corresponding to a second CI of the list of CIs to represent a compliance level associated with the second CI.

9. The system of claim 8, wherein the GUI is to filter data to provide filtered data comprising changes to the network environment.

10. The system of claim 8, wherein the GUI displays a topology of changes to the network environment.

11. The system of claim 10, wherein the GUI is to display two different topologies simultaneously.

12. The system of claim 8, wherein the GUI is to request the configuration data from a configuration database remote from the external device.

13. The system of claim 8, wherein the external device is to receive configuration data only in response to a user request for configuration data related to a specific CI and the external device is to receive change data in response to a change being detected in the configuration database.

14. A non-transitory computer readable medium comprising instructions that, when executed, cause a processor to:
obtain a snapshot of a configuration of an environment, in which the environment comprises a plurality of composite configuration items (CIs), each of the CIs comprising a plurality of configuration items;
store data from the snapshot in a configuration database;
store data related to changes in the configuration of the environment in a CI-level database, wherein the CI-level database stores less configuration data than is stored in the configuration database; and
provide user access to the CI-level database through a graphical user interface (GUI) on an external device, wherein the GUI allows a user to:
receive a request for a plurality of snapshots of the network environment from the external device for comparison;
provide configuration data associated with the plurality of snapshots to the external device;
display a list of composite configuration items (CIs) associated with the request of plurality of snapshots;
automatically display a first indicator in a first location of the GUI corresponding to a first CI of the list of CIs to represent whether a change occurred in the first CI among snapshots of the requested plurality of snapshots and to represent a type of change, wherein the first indicator visually represents the first CI being modified, the first CI being new, or the first CI being deleted; and
automatically display a second indicator in a second location of the GUI corresponding to a second CI of the list of CIs to represent a compliance level associated with the second CI.

15. The computer readable medium of claim 14, wherein the GUI further allows the user to display a type of change indicator when displaying content of the CI-level database.

16. The computer readable medium of claim 14, wherein the GUI further allows the user to display a compliance status with a configuration policy for a CI.

17. The computer readable medium of claim 14, wherein compliance of a CI with a configuration policy is maintained with a change record representing a change to the environment.

18. The computer readable medium of claim 14, further comprising instructions that, when executed, cause the processor to take the snapshots of the configuration of the environment on a periodic basis, in response to a user command, and synchronously in response to user initiated changes to the environment.

* * * * *